United States Patent [19]

Moori

[11] 4,055,487
[45] Oct. 25, 1977

[54] DRUM-TYPE SAND CLASSIFIER

[75] Inventor: Takuo Moori, Miyazaki, Japan

[73] Assignee: Akae Kikai Kogyo Co., Ltd.

[21] Appl. No.: 759,958

[22] Filed: Jan. 17, 1977

Related U.S. Application Data

[63] Continuation-in-part of Ser. No. 592,973, July 3, 1975, abandoned.

[30] Foreign Application Priority Data

July 9, 1974   Japan .................................. 49-78829
Nov. 2, 1974   Japan .................................. 49-126858
Apr. 21, 1975  Japan .................................. 50-50118

[51] Int. Cl.² .......................................... B03B 5/56
[52] U.S. Cl. .................................. 209/44; 209/452; 209/494
[58] Field of Search ................. 209/17, 18, 44, 445, 209/451, 452, 490, 494, 284, 297

[56] References Cited

U.S. PATENT DOCUMENTS

| 758,565 | 4/1904 | Shier | 209/44 |
| 1,917,300 | 7/1933 | Hardinge | 209/452 |
| 2,099,133 | 11/1937 | Munro et al. | 209/494 X |
| 2,119,414 | 5/1938 | Blanchard | 209/452 |
| 3,002,623 | 10/1961 | Fontaine | 209/406 X |
| 3,815,737 | 6/1974 | Katter | 209/44 |

Primary Examiner—Frank W. Lutter
Assistant Examiner—Ralph J. Hill
Attorney, Agent, or Firm—Frank J. Jordan

[57] ABSTRACT

A wet-type sand classifier is characterized by having a unique cone-shaped and sand-discharging means which is disposed at the outlet of the rotary drum and is employed instead of a conventional belt conveyor means to improve the classification efficiency of the apparatus.

6 Claims, 9 Drawing Figures

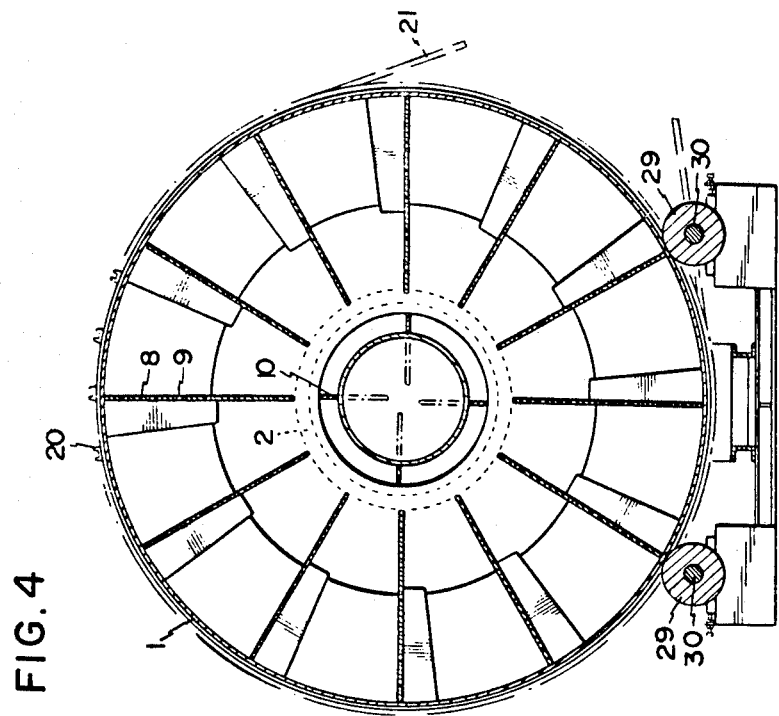
FIG. 4
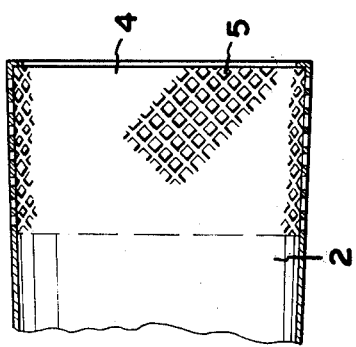
FIG. 8
FIG. 9

DRUM-TYPE SAND CLASSIFIER

This is a continuation-in-part application of U.S. Ser. No. 592,973 filed July 3, 1975, now abandoned.

BACKGROUND OF THE INVENTION

This invention relates to a drum-type sand classifier which has a cone-shaped discharge chute that effectively discharges the classified sand and is employed instead of the conventional belt conveyor.

Generally speaking, there are several methods of separating solid particles into groups which have the same particulate size range. An effective method is screening which is performed by making use of the difference of the size of particles to be classified but not of the difference of the specific gravity of the particles. However, when the classification of minute particles which have a diameter of less than 0.1 mm is required, this screening method is no longer useful.

Another effective method of separating particles into groups of the same particulate size range is called "classifying". Classifying makes use of the settling velocity of solid particles which are in a fluid body and the above velocity varies corresponding to the size as well as the specific gravity of the solid particles. This classifying generally consists of "wet classifying" which uses water as the fluid body and "dry classifying" which uses air as the fluid body. Since the viscosity coefficient of water is 50 times greater than that of air, the settling speed of solid particles also varies greatly depending on the fluid body used. Accordingly the size of a solid particle that can be classified is around $10\mu$ - 1mm with "wet classifying" while it is around $1\mu$–1mm with "dry classifying".

The sand classifier of this invention makes use of the wet classifying method by which even the muddy component can be eliminated (classified) from muddy water which results in the production of clear water.

The wet-type clasifiers generally comprise rake-type, spiral-type and drum-type classifiers. The first two of the foregoing types of classifiers, however, are seldom used any longer since their classifying efficiency is low and they cannot keep up with the demand for sand which is remarkably increasing these days. Therefore, the drum-type classifier is predominantly used.

The apparatus of this invention which is hereinafter disclosed is also a drum-type classifier, however, it differs greatly from the conventional classifier. The conventional one requires a belt conveyor which is inserted into the rotary drum of the classifier and discharges the classified sand out of the drum and is an indispensable element of apparatus, while the classifier of this invention has a unique discharge means which is integral with the rotary drum. The discharge system of the invention which is completely new and basically different from the conventional system is due to the above discharge means which results in a remarkable improvement of the classification efficiency, a great increase in the amount of sand that is discharged without sacrificing the compactness of the apparatus and a drastic decrease of mechanical failures which are caused due to friction or corrosion of the parts of the apparatus.

Since the conventional drum-type classifier requires a belt conveyor which is placed into the drum from the outlet, the outlet, which is located at the rear of the drum, must be large enough for the loading of the conveyor, which results in a low capacity for classification since the volume of muddy water which can enter the drum is small as is the amount of classified sand which is discharged from the drum.

Here, two drums are compared in order to understand the relationship between the capacity of the drum and the diameter of the outlet which is located at the rear end of the drum. Both drums have an equal length of 3.0m and an equal diameter of 2.5m. One drum has an outlet diameter of 1.7m while the other has an outlet diameter of 1.0m. Due to this structural difference, the volume of muddy water which can be retained in the latter drum is 2.3 times greater than that of the former drum since the outlet diameter is smaller. This implies that if the aforementioned belt conveyor is no longer required, a compact classifier which does not sacrifice the volume of sand discharged from classifier can be constructed.

It is an object of this invention to provide a drum-type classifier which has a cone-shaped discharge means that is formed as an integral part of the classifier and is employed for discharging the classified sand rather than using the conventional belt conveyor. Since the discharge means is an intergral part of the rotary drum, the classified sand is smoothly discharged from the drum while the drum rotates.

In the case of the conventional classifier where the rotary drum and the discharging means are independently operated, parts of the apparatus are always subject to severe frictional wear caused by sand, giving rise to various mechanical failures or accidents, which are difficult problems and remain unsolved.

It is another object of this invention to provide a classifier which produces classified sand with improved uniformity of classification set within certain limits as compared to the sand that is classified by the conventional classifiers. Due to the lowering of the percentage of mud which remains in the classified sand, sand with few mud components can be obtained which can be used to produce cements which have high rigidity.

It is still another object of this invention to provide a classifier which is capable of separating the mud from the larger sand components and is further capable of classifying the mud into coarse mud which remains in the water and discharged with it through the water discharging outlet.

The construction and operation of this invention, however, together with additional objects and advantages thereof, will be best understood from the following description of the specific embodiments when read in conjunction with the accompanying drawings.

BRIEF DESCRIPTION OF THE DRAWINGS

FIG. 4 is a transverse cross-sectional view of the apparatus of FIG. 1 taken along the line I—I.

FIG. 8 is a schematic view showing the direction of a falling particle in the muddy water.

FIG. 9 is a partial view of the feed pipe which has the rear made of expanded metal.

DETAILED DESCTIPTION OF THE INVENTION

Figure 1:
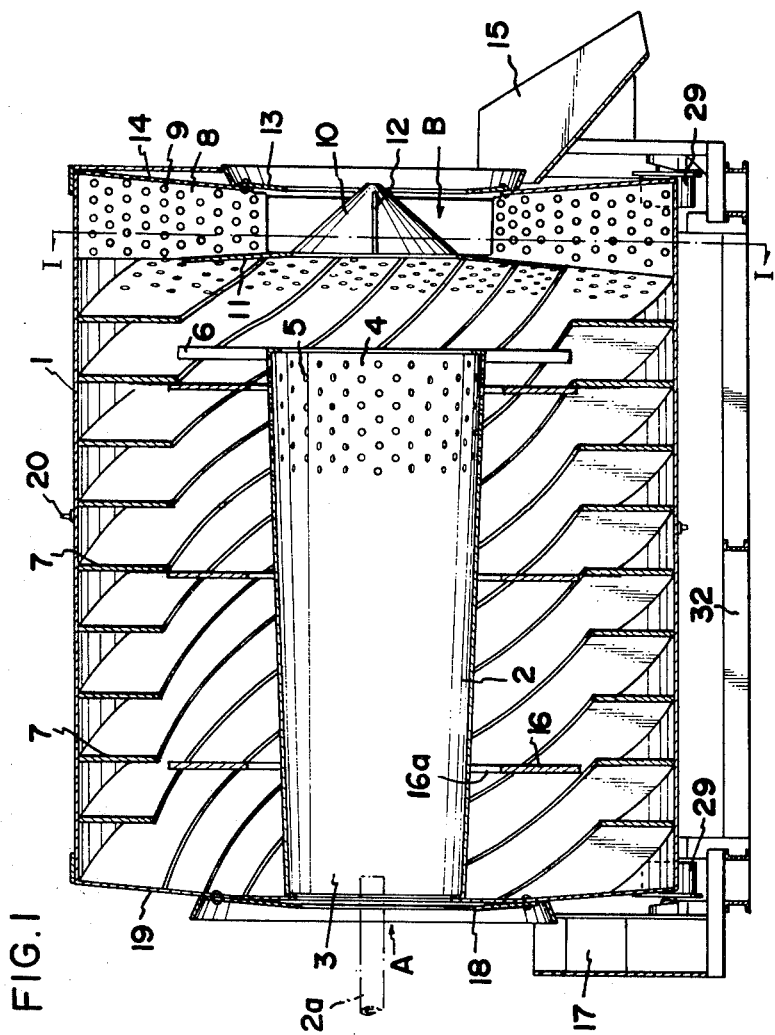
FIG. 1 is a longitudinal front view showing a drum type sand classifier of the present invention.

In this invention, a rotary drum 1 encloses a feed pipe 2 which is concentric with the drum. The pipe 2 has an inlet 3 at the front end into which the muddy water is introduced by an introduction pipe 2a and an outlet 4 at the rear end. The rear end portion of the pipehas a plural number of apertures 5 which may be provided, for example, by fabricating the rear end portion of an expanded metal mesh. The diameter of the pipe 2 gradually increases from the front end to the rear end. Furthermore the pipe 2 is supported by a plurality of frames 6 which extend radially from the outer surface of the rear end of the pipe 2 with the proximal ends of the frames 6 being secured to the rear end of the pipe 2 and the distal ends of the frame 6 being secured to the proximal ends of the helicoid blades 7. A plurality of helicoid blades 7 are fixedly secured to the entire inner surface of the drum 1 at regular pitches except at the rear end of the drum 1. A plural number of paddles 8 are radially disposed with their distal ends secured to the inner surface of the drum 1. Each paddle 8 has a number of apertures 9. A cone-shaped chute 10 is concentric with and located at the rear end of the drum 1; it is an integral part of the drum 1 with the base of the conical shape being secured to the circular plate 11 which in turn has its inclined surface secured to the sides of the paddles 8. A plural number of partitions 12 are fixedly mounted on the inclined face of the chute 10. An adjustable circular plate 13 is removably mounted at the outer periphery on a circular plate 14 which in turn has an inclined surface that is secured to the sides of the paddles 8. B indecates an outlet from which classified sand is discharged. The discharged sand is cast into a discharge chute 15.

Numeral 16 indicates a plurality of ring-like baffle plates which are disposed along the length of the drum 1 at regular or desired intervals over the feed pipe 2 concentrically and furthermore perpendicular to the rotating axis of the drum 1.

Each baffle plate 16 is supported concentrically within the drum 1 by having the outer circular periphery thereof preferably welded to the inner edges of helicoid blades 7 while an annular opening 16a through which the upper layer of the muddy water (the supernatant water) overflows toward a supernatent water outlet A is formed between inner circular periphery of the baffle plate 16 and the feed pipe 2.

Through the above outlet A, the supernatent water is carried into a water discharge chute 17. The discharged supernatant water is delivered to a reservoir by a suitable means such as a pump (not shown in the drawings). Numeral 18 indicates an adjustable circular plate which is removably mounted on the front-side of plate 19 the outer periphery of which in turn is secured to the front most edge of the drum 1.

Figure 2:
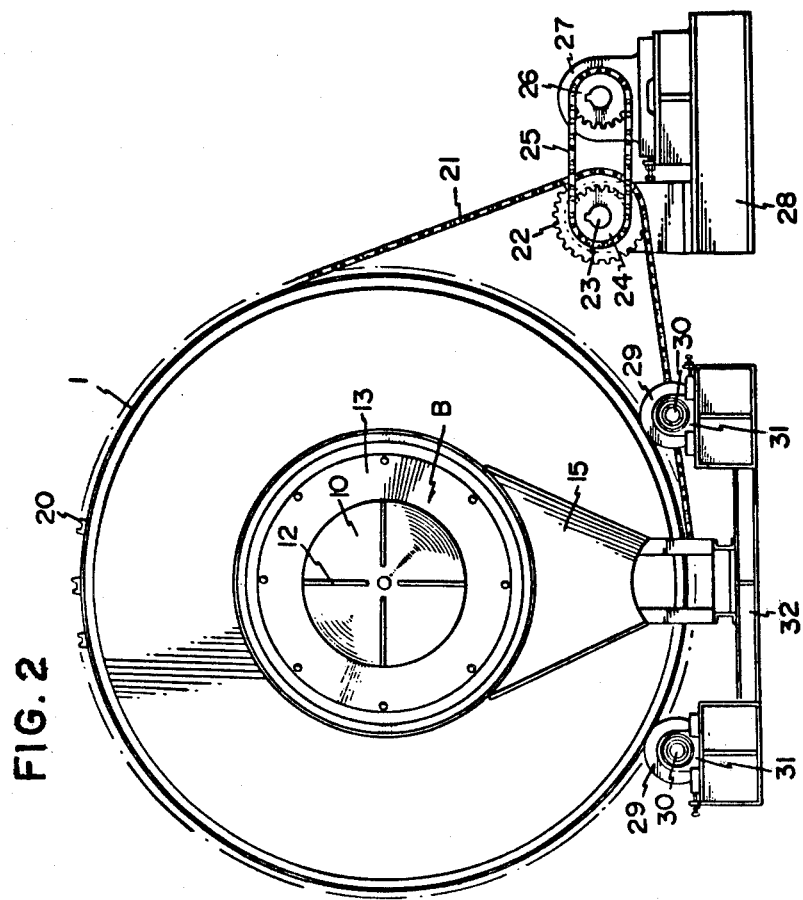
FIG. 2 is a rear transverse view of the apparatus shown in FIG. 1
Figure 3:
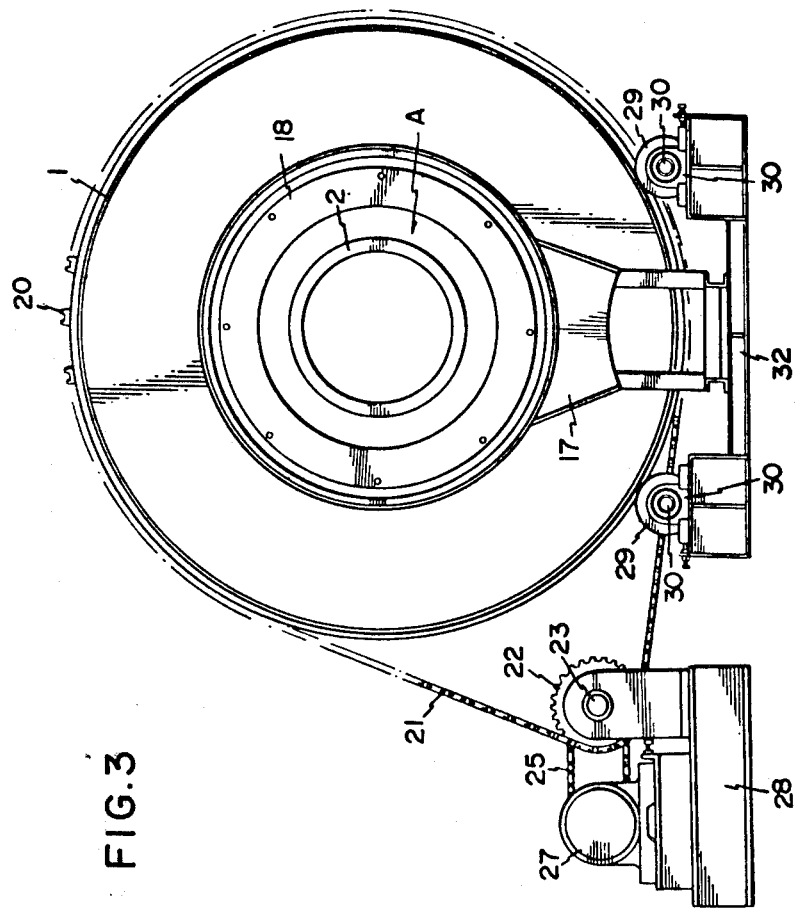
FIG. 3 is a front transverse view of the apparatus shown in FIG. 1.
Figure 5:
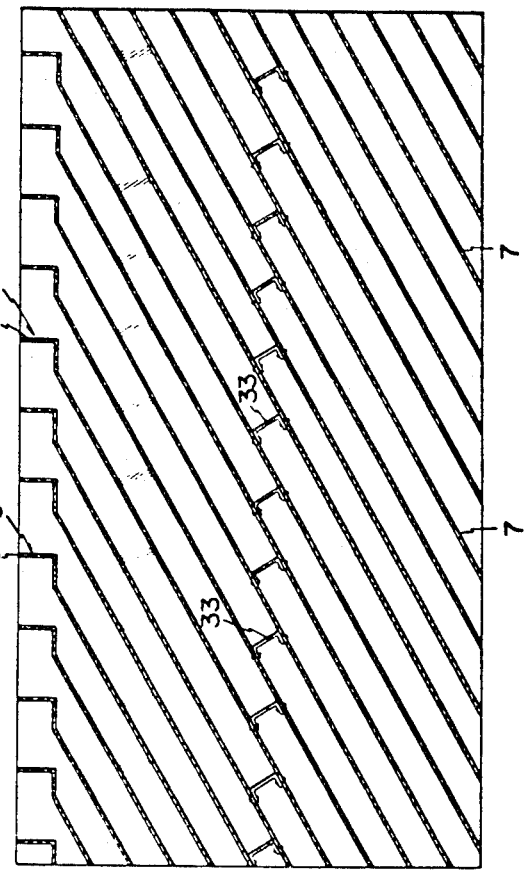
FIG. 5 is a developed view of the drum of the apparatus of FIG. 1 showing the relationship among helicoid blades, paddles and the blockade plates.
Figure 6:
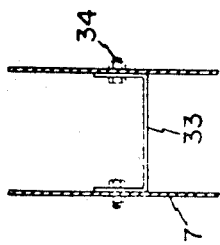
FIG. 6 is an expanded plan view of a portion of FIG. 5.
Figure 7:
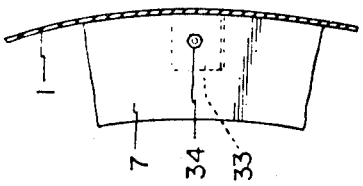
FIG. 7 is a longitudinal side view of a portion of FIG. 6.

With reference to FIG. 2, a plurality of teeth 20 are fixedly attached to the outer circumference at the midsection of the drum 1. An endless chain 21 is extended between the drum 1 and a first sprocket wheel 22 which is fixedly mounted on a shaft 23. A second sprocket wheel 24 is fixedly mounted on the same shaft 23. Numeral 25 indicates an endless chain which extended between the second sprocket wheel 24 and a third sprocket wheel 26 that is fixedly mounted on a shaft of a motor 27. Numeral 28 indicates a base on which the above sprockets and the motor 27 are mounted. The drum 1 is rotatably supported by plural pairs of rollers 29. Each roller 29 is fixedly mounted on shafts 30 which have both ends journal mounted in bearings 31. Bearings 31 are fixedly mounted on a frame structure 32. Referring to FIGS. 3, 5, 6 and 7, a plurality of blockade plates 33 are shown which are disposed along the inner circumference of the drum at the required longitudinal positions, wherein each plate 33 is inserted between two helicoid blades 7 and has both sides secured to the side edge of the blades 7 by bolts 34. The height of the plates 33 is half that of the blades 7.

The manner in which the apparatus is operated is hereinafter described with reference to the individual operation of parts of the apparatus.

The muddy water which contains sand is continuously supplied to the front inlet 3 of the feed pipe 2 while the drum 1 is rotated by the motor 27 at a considerably low speed. Since the feed pipe 2 has a diameter which gradually and continuously increases toward the rear end of the pipe, the muddy water which is introduced into the pipe 2 passes through the apertures 5 and is dispersed downwardly into the drum 1. Some of the remaining flow of water may pass downwardly from the outlet 4 of the pipe. Therefore, the muddy water loses flow energy or velocity and no vortexes occur at the point where the water leaves the feed pipe 2, which results in improvement of the classification. The muddy water is then forced to overflow the pluraliy of baffle plates 16 and move towards the water discharge oulet A located at the front end of the drum 1. During the above mentioned movement of the muddy water in the direction of the water discharge outlet A, sand particles which have a specific gravity that is greater than that of water settle onto the bottom of the drum 1, bumping into the baffle plates 16 and losing their flow energy.

Furthermore, these baffle plates fascilitate the smooth flow of the supernatant water toward the outlet A.

Namely, the bottom layer of muddy water between each two helicoid blades which may move together with settled sand toward the sand outlet B by the slow rotation of the drum 1 does not affect or hamper the above-mentioned flow of the supernatant water toward the outlet A since the space between each two baffle plate works as an intermediate sand settling zone. Then the settled sand is transferred by the rotation of the helicoid blades 7 to the rear end of the drum 1 where a plurality of paddles 8 are disposed. Each helicoid blade 7 has many apertures at the rear portion so that it can move smoothly without any flow resistance of the water. Furthermore, if desired, the movement of sand containing some settled mud towards the discharge outlet maybe prevented by a number of blockade plates 33 and the blockaded sand is moved along the inner surface of the drum 1 by the rotation of the drum 1. When the sand is transferred to the "top dead point" where it starts sliding into the blockade plates 33, the sand falls onto the upper portion of the feed pipe 2 and then is scattered into the water. The scattered sand or mud components move in one of the directions in the water as shown in FIG. 8 depending on the size and specific gravity of the sand, wherein a indicates a mud particle; b, a minute sand particle; c, a coarse particle and F indicates the flow direction of the muddy supernatant water. By the repetition of the above actions where the effect is proportional to the number of blockade plates 33 that are attached, the particle size distribution of the classified sand is adjustable. Then, as the sand is moved along the inner surface of the drum 1 towards the upper portion due to the rotation of the drum 1, the water which is transported along with the sand is entirely eliminated through a number of apertures 9 in each paddle 8. When the sand which is free of water is transferred to a location directly above the cone-shaped discharge means 10, the sand is cast onto the inclined surface of the discharge means 10. Since a necessary number of partitions 12 are fixedly secured to the inclined surface of the dischrge means 10, the sand which is cast onto the discharge means 10 slides along the inclined surface and is discharged from the discharge outlet B.

Meanwhile, the supernatant water, which is the remainder of the muddy water after the sand of the required size range has settled onto the bottom of the drum 1, is caused to overflow from the discharge outlet A into the water discharge chute 17. The water is then transferred to a reservoir by a suitable means such as a power-operated pump.

According to this invention, the apparatus is characterized by the following itemized advantages;

1. The sand which is contained in the muddy water is to some extent forcibly cause to settled onto the bottom of the drum 1 by employing a number of helicoid blades 7, which substantially, does not agitate the muddy, water since the drum is rotated at a considerably low speed; therefore the volume of minute sand particles which overflow with the supernatant water can be limited to as small an amount as possible, resulting in remarkable classification efficiency.

2. Since the feed pipe 2 is constructed as an intergral part of the rotary drum 1, and, therefore rotates with the drum 1, the sand is uniformly distributed over the entire inner surface of the drum 1 so that wear also occurs evenly on the entire surface of the drum 1 rather than on certain portions only and enables the apparatus to withstand long use.

3. Since the feed pipe 2 has a diameter which gradually increases toward the rear end and has a number of apertures 5 at the rear end, the muddy water charged into the pipe 2 passes through the apertures 5 and is dispered into the drum 1. Therefore, the muddy water loses its flow energy or speed and there is no occurrence of vortexes at the place where the muddy water drops into the drum 1.

4. Each helicoid blade 7 has a number of apertures at the rear portion so that the blade can be rotated using less power since the blade incurs less resistance to the flow of the muddy water.

5. Each helicoid blade 7 has a number of apertures at the rear portion so that the blade can be rotated using less power since the blade incurs less resistance to the flow of the muddy water.

6. The attachment of a plurality of baffle plates 16 to the helicoid blades 7 enables the positive lowering of the flow energy of the muddy water whereby the settling efficiency of the sand is improved.

7. In the muddy water which is introduced into the drum 1, the coarse sand easily settles to the bottom of the drum 1 as soon as the muddy water drops into the drum 1 from the feed pipe 2 and is transferred to the discharge outlet B. The minute or fine sand, which unlike the coarse sand does not settle instantly strikes the baffle plates 16 as it moves in the muddy water towards the water discharge outlet A, whereby the fine sand is also urged to settle on the bottom of the drum 1.

8. The smooth and natural movement of the settled sand is assured since the sand which has settled onto the bottom of the drum 1 is transferred in the direction of the discharge outlet B simply by the rotation of the drum.

9. The product (the classified sand) is automatically discharged from the drum 1 by the simple rotation of the drum 1.

10. Since there are no driving means such as shafts or bearings nor any means for conveying sand within the rotary drum 1, all of which are ill-affected by water, mechanical failures are completely eliminated.

11. Since in the apparatus of this invention it is unnecessary to employ a belt conveyor at the discharging outlet B, and a stationary chute at the water discharging outlet A, the diameters of these two outlets A and B are both made as small as possible, whereby the amount of settled sand in the drum 1 of this invention can be more than twice that in the conventional apparatus which results in an improvement of the classifying performance in the apparatus.

12. The location and number of rows of blockade plates 33 can be varied to correspond to the amount of raw material to be introduced, i.e., the capability of the apparatus to classify sand in a much wider range of sizes is made possible.

13. Since the mud component that is affixed to the sand particles removed by the agitation which is caused by a plurality of blockade plates 33, the degree of uniformity, set within certain limits, of the classified sand is remarkably increased.

14. The particle size distribution of the product, the classified sand, is adjustable by way of increasing or decreasing the number of blockade plates 33.

What we claim is:

1. A wet-type sand classifier comprising:
   a. a rotary drum which has a front outlet at its front end and a rear outlet at its rear end,
   b. a feeding means for feeding muddy water containing sand into said drum, said feeding means being enclosed by said drum and disposed concentrically within said drum, and attached to said drum for rotation with said drum,
   c. a classifying means for causing sand which is contained in said muddy water to settle onto the bottom of said drum and transferring said settled sand towards the rear end of said drum, said classifying means being disposed on the interior surface of said drum and covering the entire length of said drum, said classifying means comprising a plurality of helicoid blades of the same pitch which are fixedly secured to the inner wall of said drum at regular intervals, said helicoid blades being of a height which gradually increases toward the rear end of said drum, and a plurality of paddles radially disposed around the inner periphery of said drum at the rear end of said drum, each of said paddles having a number of apertures on the entire surface thereof for separating the water from the sand before the sand is discharged from the classifier, and
   d. a discharging means for expelling said transferred sand from the rear outlet of said drum, said discharging means being disposed at the rear end of said drum and attached to said drum for rotation with said drum, whereby substantially water-free classified sand of a desired size range is produced by the rotation of said drum with minimum wear of the classifier due to friction from the sand.

2. A wet-type sand classfier according to claim 1, wherein said discharging means comprises a cone-shaped member having an exterior inclined surface, and a plurality of partitions fixedly secured to said inclined surface.

3. A wet-type sand classifier according to claim 1, wherein said feeding means comprises a feed pipe which extends from the front end to the rear end of the drum and which has a diameter that gradually and continuously increases toward the rear end and which also has a number of apertures located at the rear end.

4. A wet-type sand classifier accoring to claim 3, wherein the rear end of said pipe is made of expanded metal mesh, the mesh providing the apertures.

5. A wet-type sand classifier according to claim 1, wherein said classifying means further comprises a plurality of baffle plates secured to the respective sides of said helicoid blades.

6. A wet-type sand classifier according to claim 5, wherein said classifying means further comprises a plurality of blockade plates, each of said blockade plates being removably mounted between every two of said helicoid blades.

* * * * *